United States Patent

Aoyama et al.

[11] Patent Number: 6,159,296
[45] Date of Patent: Dec. 12, 2000

[54] OPTICAL LENS COLORING SYSTEM

[75] Inventors: Masahiro Aoyama; Jian Jiang, both of Tokyo, Japan

[73] Assignee: Hoya Corporation, Tokyo, Japan

[21] Appl. No.: 09/244,772

[22] Filed: Feb. 5, 1999

[30] Foreign Application Priority Data

Feb. 5, 1998 [JP] Japan ................................. 10-024201

[51] Int. Cl.7 .............................. B05C 11/10; B05B 7/08; B05B 12/04
[52] U.S. Cl. .......................... 118/695; 118/696; 118/315; 118/321; 8/507
[58] Field of Search .................................... 118/313, 315, 118/319, 320, 321, 323, 52, 56, 686, 695, 696, 500; 427/168; 8/507

[56] References Cited

U.S. PATENT DOCUMENTS

| 5,560,751 | 10/1996 | Hoshiyama | 8/506 |
| 5,820,673 | 10/1998 | Sentilles et al. | 118/319 |

FOREIGN PATENT DOCUMENTS

| 195 02 537 | 8/1996 | Germany . |
| 54-58508 | 5/1979 | Japan . |
| 54-112657 | 9/1979 | Japan . |
| 60-180846 | 9/1985 | Japan . |
| 1-277814 | 11/1989 | Japan . |
| 2-216101 | 8/1990 | Japan . |
| 2-216118 | 8/1990 | Japan . |
| 2-251903 | 10/1990 | Japan . |
| 5-318715 | 12/1993 | Japan . |
| 7-068851 | 3/1995 | Japan . |
| 8-20076 | 1/1996 | Japan . |
| 8-20080 | 1/1996 | Japan . |
| 8-112566 | 5/1996 | Japan . |
| 9-99494 | 4/1997 | Japan . |

Primary Examiner—Richard Crispino
Assistant Examiner—George R. Koch, III
Attorney, Agent, or Firm—Griffin & Szipl, P.C.

[57] ABSTRACT

It is difficult to efficiently fabricate optical lenses on which gradation coloring is finely implemented. Gradation coloring is implemented on optical lenses by using an optical lens coloring system having an optical lens holding device for holding an optical lens, a coloring agent discharging device provided with one or a plurality of nozzles for discharging coloring agent for coloring the optical lens, and a relative position control device for controlling a relative position of the optical lens holding device and the coloring agent discharging device. The relative position control device controls the relative position of the optical lens holding device and the coloring agent discharging device such that coloring agent discharged out of the coloring agent discharging device arrives at a predetermined plane substantially from a direction normal to a predetermined plane of an optical lens held by the optical lens holding device.

4 Claims, 3 Drawing Sheets

OPTICAL LENS COLORING SYSTEM

BACKGROUND OF THE INVENTION

1. Field of the Invention

The present invention relates to a system for coloring an optical lens into a desired pattern (hereinafter referred to as an optical lens coloring system), and a method for coloring lenses.

2. Description of the Related Art

Spectacle or eyeglass lenses have come to be often worn and are used not only for the purpose of correcting visual acuity but also for the purpose of obtaining a particular cosmetic effect or medical effect (to protect the eves from ultraviolet rays, for example) in recent years, and, along with that, coloring of spectacle lenses has come to be actively conducted. Because gradation colored spectacle lenses have a highly desirable cosmetic effect, they account for a considerable percentage of colored spectacle lenses.

As methods for coloring spectacle lenses, there have been known (i) a method of fixing liquid having coloring capability after adhering on a base material lens by means of a soaking method, a spraying method or a spinning method (spinner method) (see JP-A-60-235101), (ii) a method of pasting a colored film on a spectacle lens to transfer coloring agent contained in the film to the spectacle lens (diffusion transferring method), and (iii) a method of coloring a spectacle lens by heating and sublimating organic pigment in a gaseous phase (see JP-B-35-1384).

The method (i) described above is a suitable method in coloring the whole surface of the lens uniformly and allows a colored spectacle lens whose thickness of a colored layer is uniform, whose color is uniform, whose color tone and concentration are constant, whose color does not fade and whose color tone does not change to be obtained. However, in implementing gradation coloring on spectacle lenses, the method (i) described above cannot be said to be a particularly preferable method for the following reasons.

It is necessary to adhere liquid having a tinting power to the spectacle lens (base material lens) in advance by soaking in order to implement gradation coloring because it is very difficult to implement gradation coloring in the desirable manner by application of a spraying or spinning method (spinner method) in adhering a coloring solution to a small object such as the spectacle lens. It thus becomes necessary to control the time for soaking the spectacle lens (base material lens) in the liquid per part of the lens. As a result, it takes a long time to color lenses in this manner and it is difficult to fabricate colored lenses efficiently.

Meanwhile, it is necessary to make a film gradation-colored by the method (i) described above and to transfer a coloring agent by pasting this film onto the spectacle lens in implementing gradation coloring on a spectacle lens according to method (ii) described above. However, it is difficult to paste the film precisely on the surface of a spectacle lens because the surface of the lens is curved. Therefore, method (ii) above, has had problems from the aspect of precision.

It is also very difficult to implement gradation coloring on a spectacle lens by the method (iii) described above.

It is therefore an object of the present invention to provide an optical lens coloring system for efficiently providing an optical lens or its base lens material, or, specifically, a spectacle lens or its base lens material, with a desired color pattern of a desirable color, e.g., letters, patterns, gradation coloring or the like, on the surface of the lens or base lens material.

It is also an object of the present invention to provide a method for coloring lenses having the above characteristics.

SUMMARY OF THE INVENTION

In accordance with the above objects, there is provided, according to the present invention, an optical lens coloring system which has an optical lens holding means for holding an optical lens (optical lens is interpreted herein to include a base lens material), a coloring agent discharging device (or means) provided with one or a plurality of nozzles for discharging coloring agent for coloring the optical lens, and a relative position control device (or means) for controlling the relative position of the optical lens holding device and the coloring agent discharging device. The system is characterized in that the relative position control device controls the relative position of the optical lens holding device and the coloring agent discharging device such that the coloring agent discharged out of the coloring agent discharging device arrives at a predetermined plane substantially from the same direction as a direction normal to a predetermined plane of the optical lens held by the optical lens holding device.

Further objects, features and advantages of the present invention will become apparent from the Detailed Description of Preferred Embodiments, which follows, when considered in light of the attached figures.

DETAILED DESCRIPTION OF THE PREFERRED EMBODIMENTS

Figure 1A:
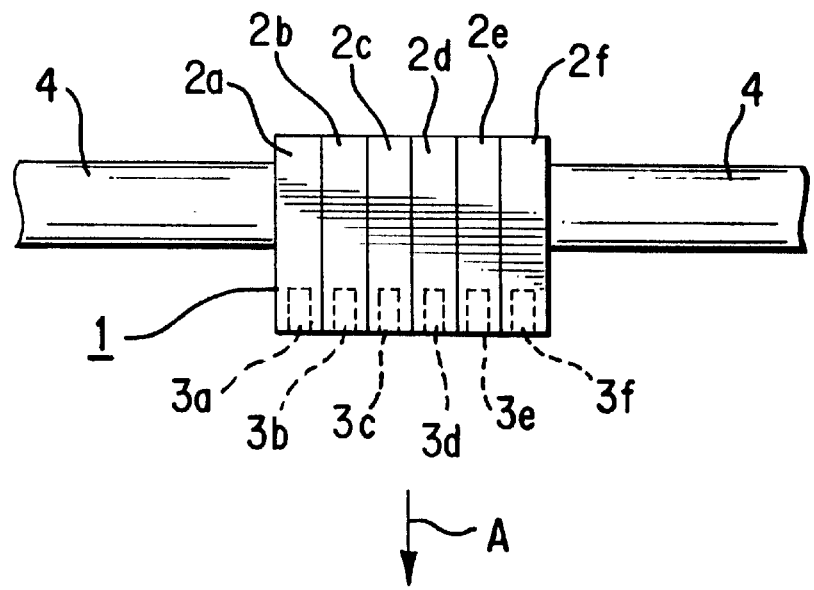
FIGS. 1(*a*) and 1(*b*) are plan views showing two examples according to the present invention of the disposition of a plurality of nozzles when a coloring agent discharging device is provided with nozzles.

Several illustrative, preferred embodiments for carrying out the invention will be explained below in detail, with reference to the attached figures in which like parts are referred to by like reference numerals.

The inventive optical lens coloring system has optical lens holding device (or means) for holding an optical lens, coloring agent discharging device (or means) comprising one or a plurality of nozzles for discharging coloring agent for coloring the optical lens and a relative position control device (or means) for controlling the relative position of the optical lens holding device and the coloring agent discharging device as described above.

The above-mentioned optical lens holding device may be what can support the optical lens without impeding a predetermined surface of the optical lens from being colored and whose relative position with the coloring agent discharging device can be changed by a relative position control device (or means) as described later.

The relative position between the optical lens holding device and the coloring agent discharging device may be changed (1) by moving the coloring agent discharging device in a predetermined direction while fixing the optical lens holding device; (2) by moving the optical lens holding device in a predetermined direction while fixing the coloring agent discharging device; or (3) by moving both of the optical lens holding device and the coloring agent discharging device in predetermined directions, respectively. The present invention adopts all of the means (1) through (3) described above. Accordingly, it is possible to select appropriately whether or not to provide a mechanism for moving the optical lens holding device in a desired direction.

It is noted that the technology of moving the optical lens or its material held by specific holding device (or means), together with the holding device, in a predetermined direction in moving the optical lens holding device in the predetermined direction is a technology already automated in polishing processes and the like used in fabricating optical lenses, so that such technology may also be utilized in the present invention.

Meanwhile, the coloring agent discharging device (or means) discharges coloring agent for coloring the optical lens in a predetermined direction and to that end, is provided with one or a plurality of nozzles. It is preferable that the coloring agent discharge device be provided with many nozzles to implement gradation coloring on the optical lens in a short time. A discharge opening of each nozzle is preferably fine in order to implement fine gradation coloring.

Figure 1B:
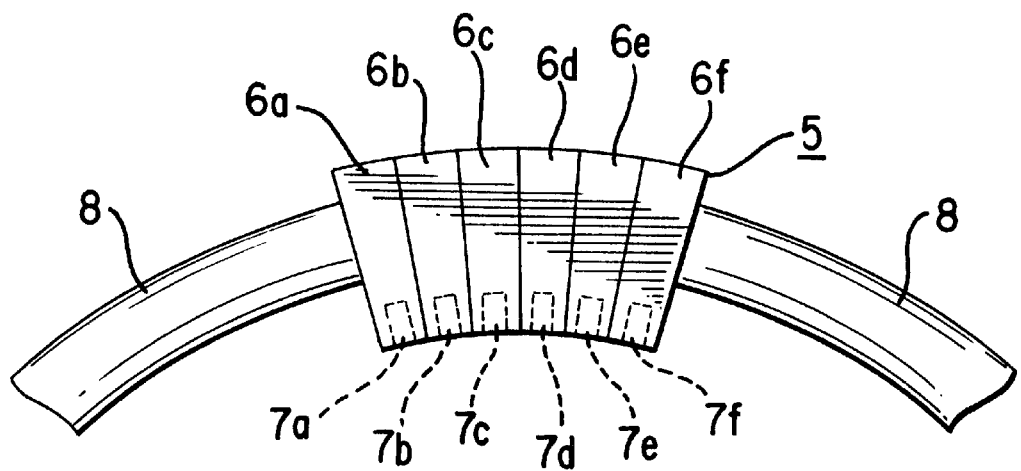

When a plurality of nozzles are provided in the coloring agent discharging device (or means), the coloring agent discharging device may be constructed such that each discharge opening of nozzles 3a, 3b, 3c, 3d, 3e and 3f in coloring agent discharge sections 2a, 2b, 2c, 2d, 2e and 2f composing the coloring agent discharging device i opens substantially to one plane; such that the coloring agent discharging direction from each of the nozzles 3a through 3f is substantially the same (i.e., in the direction of arrow A shown in FIG. 1(*a*)). This relationship is shown, for example, with reference to the coloring agent discharging device 1 shown in FIG. 1(*a*).

On the other hand, the coloring agent discharging device may be constructed such that each discharge opening of nozzles 7a, 7b, 7c, 7d, 7e and 7f in coloring agent discharge sections 6a, 6b, 6c, 6d, 6e and 6f composing coloring agent discharging device (or means) 5 opens on a desirable concave curved surface corresponding to the shape of surface of an optical lens to be colored. This relationship is shown, for example, with reference to the coloring agent discharging device 5 shown in FIG. 1(*b*).

Contrary to the case of the coloring agent discharging device 5 shown in FIG. 1(*b*), the coloring agent discharging means may be constructed such that a discharge opening of each nozzle opens on a desirable convex curved surface corresponding to the shape of surface of an optical lens to be colored. The coloring agent discharging device may be constructed also such that it can reversibly assume states in which (1) each discharge opening of the plurality of nozzles opens substantially to one plane, or (2) opens to the desirable curved surface (the concave curved surface or the convex curved surface described above).

Reference numeral 4 in FIG. 1(*a*) denotes a supporting section for supporting the respective coloring agent discharge sections 2a through 2f and reference numeral 8 in FIG. 1(*b*) denotes a supporting section for supporting the respective coloring agent discharge sections 6a through 6f. The coloring agent discharging device 1 shown in FIG. 1(*a*) and the coloring agent discharging device 5 shown in FIG. 1(*b*) are shown for the purpose of illustrating a certain configuration of the plurality of nozzles, but the coloring agent discharging device of the present invention is not limited to the illustrated configurations.

The coloring agent discharging mechanism itself in the coloring agent discharging device may be constructed in the same manner as an ink discharging mechanism in a bubble jet printer (so-called "bubble type" ink discharging mechanism) or an ink discharging mechanism in a so-called "piezo type" ink jet printer for example.

Color of a coloring pattern, such as letters, patterns and gradation coloring, may be controlled by a type (color) of coloring agent discharged out of each nozzle and its combination, or by concentration of dye or pigment contained in a droplet of coloring agent discharged out of each nozzle. Accordingly, when the coloring agent discharging device is provided with a plurality of nozzles, the type of coloring agent discharged out of each nozzle may be the same or be different. It is noted that even if color of dye or pigment in use is the same, two coloring agents whose concentration are different are considered to be different coloring agents.

The shape of a coloring pattern may be controlled by the size of a droplet of the coloring agent discharged out of each nozzle or the density of droplets discharged per unit area. For instance, when gradation coloring is implemented on an optical lens by using one type of coloring agent, it is required to control the size of droplet of the coloring agent to be discharged out of each nozzle (including a case when there is one nozzle) and the density of the droplet to be discharged per unit area in each time of the coloring step corresponding to a specification (coloring pattern) of the target gradation coloring, and the shape and the size of the optical lens to be colored.

Accordingly, it is preferable for the coloring agent discharging means to have discharge amount control device (or means) for controlling an amount of coloring agent to be discharged out of each nozzle (including the case when there is one nozzle). Preferably, the discharge amount control device has a storage device for storing information on a target coloring pattern and on the shape and the size of an optical lens to be colored in the form of digital signals for example and controls the amount of coloring agent to be discharged out of each nozzle (including the case when there is one nozzle) based on the information stored in the storage device. In addition, the inventive optical lens coloring system is preferable to have an input device for storing the information in the storage device.

The coloring agent discharging device in the optical lens coloring system according to the present invention can have its relative position with the optical lens holding device, described above, changed by a relative position control device, described below. The relative position between the coloring agent discharging device and the optical lens holding device may be changed by the devices (1) through (3) described in the explanation of the optical lens holding device and either one of devices (1) through (3) may be adopted in the present invention. Accordingly, it is possible to appropriately select whether or not to provide a mechanism for moving the coloring agent discharging device in a desirable direction.

The number of coloring agent discharging devices may be any desirable number equal to or greater than 1 in the inventive optical lens coloring system. For instance, it becomes possible to color an optical lens in a desirable pattern in a shorter time because two main surfaces of the optical lens may be colored in the same time by providing two coloring agent discharging device and by arranging the system so as to color one main surface of the optical lens with one selected coloring agent discharging device and to color the other main surface of the optical lens by the other coloring agent discharging device.

Preferably, the coloring agent to be discharged out of the coloring agent discharging device contains aqueous dye, non-aqueous dye such as oil soluble dye, inorganic pigment or organic pigment. Those dyes or pigments may be used alone or may be used in combination. Water insoluble dispersible dye, oil soluble dye or organic pigment are preferable when color transparency and lightness, visibility of color tone, tinting power, heat resistance and other characteristics are taken into account. ORIENT CHEMI-CAL YELLOW 4120 (product name, produced by Orient Chemical Co., Ltd.), or the like, which is a commercially available oil soluble dye, may be named as an especially preferable dye and DAINIPPON INK LIGHT YELLOW HG (product name, produced by Dainippon Ink and Chemical Co. , Ltd.), or the like, which is a commercially available organic pigment, may be named as a specially preferable pigment.

The above-mentioned coloring agents contain liquid component, beside the dye or the pigment, which plays a role corresponding to solvent or carrier of the dye or the pigment (hereinafter this liquid component will be referred to as a "vehicle"). The vehicle must have the functions of at least dissolving or dispersing the dye or the pigment uniformly and of adhering the dye or the pigment to the surface of a lens. Further, it is preferable to have another function, e.g., a function of hard-coating the surface of a lens.

Beside the optical lens holding device and the coloring agent discharging device described above, the inventive optical lens coloring system has a relative position control device for controlling the relative position of those devices. The control of the relative position between the optical lens holding device and the coloring agent discharging device is made by the relative position control device such that the coloring agent discharged out of the coloring agent discharging device arrives at a predetermined plane substantially from the same direction with a normal direction on the predetermined plane of an optical lens held by the optical lens holding device.

While it is necessary to move at least one of the optical lens holding device or the coloring agent discharging device during each the coloring step point by point in a predetermined direction to make the above-mentioned control, it is possible to appropriately select in which direction and in which manner to move the optical lens holding device and the coloring agent discharging device respectively corresponding to the shape of the surface of the optical lens to be colored, the disposition of the nozzles in the coloring agent discharging device, etc.

For instance, when the surface of the optical lens to be colored is curved, the coloring agent discharging device is provided with one or a plurality of nozzles and the discharge opening of each nozzle opens substantially to one plane, combinations A through D shown in the following Table 1 may be cited as concrete examples of motion patterns of the optical lens holding devices and the coloring agent discharging devices.

TABLE 1

| | Motion of Optical Lens Holding Device | Motion of Coloring Agent Discharging Device |
|---|---|---|
| A | rotary motion, oscillating motion, uniaxial horizontal motion, vertical motion | fixed |
| B | rotary motion, oscillating motion, vertical motion | uniaxial horizontal motion |
| C | rotary motion, oscillating motion, biaxial horizontal motion | vertical motion |
| D | rotary motion, oscillating motion | uniaxial horizontal motion, vertical motion |

Further, when the surface of the optical lens to be colored is curved, the coloring agent discharging device is provided with a plurality of nozzles and the discharge opening of each nozzle opens to a predetermined curved surface corresponding to the shape of the surface of the optical lens, combinations E and F shown in the following Table 2 may be cited as concrete examples of motion patterns of the optical lens holding device and the coloring agent discharging device.

TABLE 2

| | Motion of Optical Lens Holding Device | Motion of Coloring Agent Discharging Device |
|---|---|---|
| E | biaxial horizontal motion, vertical motion | fixed |
| F | rotary motion, oscillating motion, vertical motion | fixed |

Then, when the respective motion patterns of the optical lens holding device and the coloring agent discharging device are combined like combinations G through J shown in the following Table 3 for example, it becomes possible to color the optical lens such that the coloring agent arrives at the surface substantially from the same direction as a direction normal to the surface of the optical lens, even when the discharge opening of the nozzles composing the coloring agent discharging means opens substantially to one curved surface or opens to the predetermined surface corresponding to the shape of the surface of the optical lens to be colored.

TABLE 3

| | Motion of Optical Lens Holding Device | Motion of Coloring Agent Discharging Device |
|---|---|---|
| G | rotary motion, biaxial horizontal motion, vertical motion | oscillating motion |
| H | rotary motion, uniaxial horizontal motion, vertical motion | oscillating motion, uniaxial horizontal motion |
| I | rotary motion, biaxial horizontal motion | oscillating motion, vertical motion |
| J | rotary motion, uniaxial horizontal motion | oscillating motion, uniaxial horizontal motion, vertical motion |

It is noted that "rotary motion", "uniaxial motion", "biaxia horizontal motion", "vertical motion" and "oscillating motion" of the optical lens holding means in Tables 1 through 3 described above mean the following motions, respectively.

(A) Rotary Motion

Figure 2A:
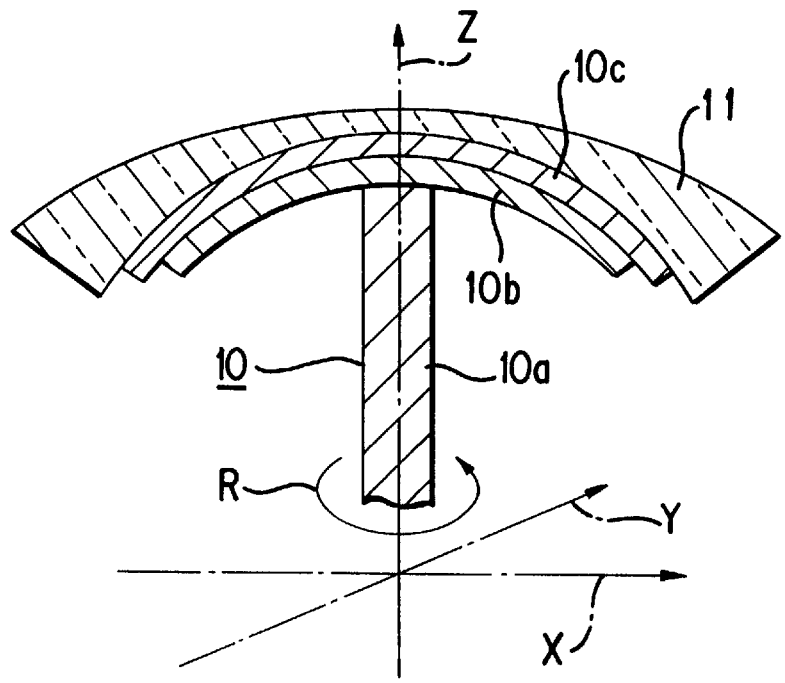
FIGS. 2(*a*) and 2(*b*) are section views showing one exemplary optical lens holding means and an optical lens held by the optical lens holding means, according to the present invention.

Rotary motion, as used herein, means a motion of the optical lens holding means 10 by which the optical lens 11 held by the optical lens holding device 10 turns in the direction indicated by an arrow R or in the direction opposite from that centering on a Z-axis as shown in FIG. 2(a). In this case an X-Y-Z coordinate system is defined using a specific axis along which the coloring agent discharging device moves horizontally (uniaxial horizontal motion), as described later as an X-axis, a direction orthogonal to the X-axis when the coloring agent discharging device is seen from the back of the coloring agent discharging device (i.e., a surface on the opposite side from the surface where the discharge openings of the nozzles are provided) as a Y-axis direction and a direction orthogonal to both of these X and Y-axes as a Z-axis direction (the same applies also in the cases of (B), (C), (D), (E), (a), (b) and (c) below). It is noted that the Z-axis described above passes through the geometrical center of the optical lens (B) Uniaxial Horizontal Motion Uniaxial Horizontal Motion, as used herein, means a motion of the optical lens holding device 10 by which an arbitrary point on the optical lens 11 (see FIG. 2(a)) held by the optical lens holding device 10 (see FIG. 2(a)) moves in a desired direction only along the X-axis.

(C) Biaxial Horizontal Motion

Biaxial Horizontal Motion, as used herein, means a motion of the optical lens holding device 10 by which an arbitrary point on the optical lens 11 (see FIG. 2(a)) held by the optical lens holding device 10 (see FIG. 2(a)) moves in a desired direction along the X-axis and a motion of the optical lens holding device 10 by which the arbitrary point moves in a desired direction along the Y-axis can be freely switched.

(D) Vertical Motion

Vertical motion, as used herein, means a motion of the optical lens holding device 10 by which an arbitrary point on the optical lens 11 (see FIG. 2(a)) held by the optical lens holding device 10 (see FIG. 2(a)) moves in a desired direction along the Z-axis.

(E) Oscillating Motion

Oscillating motion, as used herein, means a motion of the optical lens holding device 10 by which an arbitrary point on the optical lens 11 moves in a direction indicated by an arrow S1 (See, FIG. 2b) or in the direction opposite from that direction in arc on a YZ plane or a plane parallel with the YZ plane.

Figure 2B:
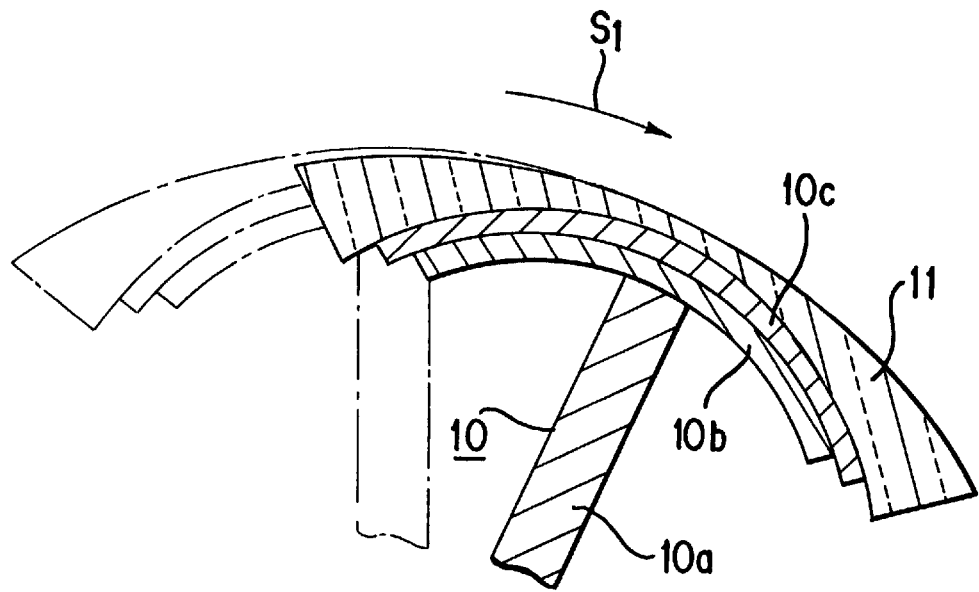

It is noted that the reference numeral 10a in FIGS. 2(a) and 2(b) denotes a lens supporting rod composing the optical lens holding means 10 and the reference numerals 10b and 10c denote buffer members provided between the lens supporting rod 10a and the optical lens 11. Further, the optical lens holding device 10 shown in FIGS. 2(a) and 2(b) are shown for the purpose of illustrating the "rotary motion", "horizontal motion I", "horizontal motion II", "vertical motion" and "oscillating motion" of the optical lens holding device in Tables 1 through 3 described above and it does not mean that the optical lens holding device of the present invention is limited to the optical lens holding device 10.

Meanwhile, the "uniaxial horizontal motion", "vertical motion" and "oscillating motion" of the coloring agent discharging device in Tables 1 through 3 described above mean the following motions, respectively.

(A) Uniaxial Horizontal Motion

Figure 3:
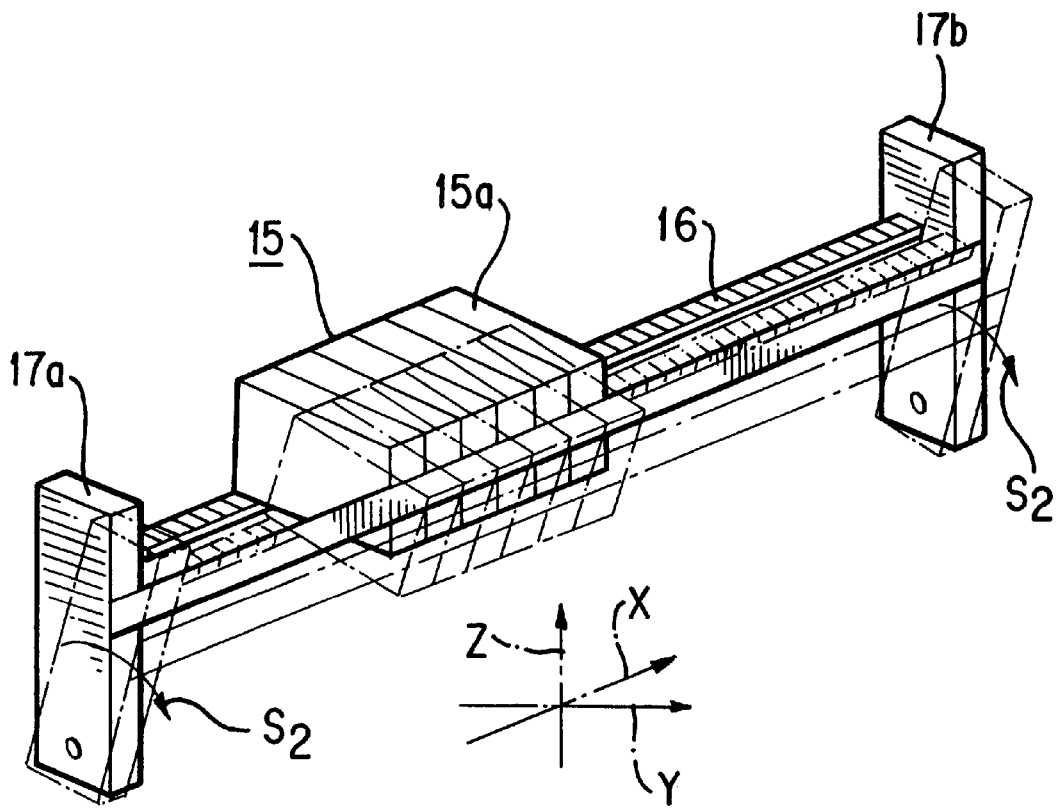
FIG. 3 is a perspective view showing one example of a coloring agent discharging means and one example of a supporting member for supporting the coloring agent discharging means, according to the present invention.

Uniaxial horizontal motion means a motion of the coloring agent discharging device by which the discharge opening of the nozzle moves along a specific axis (X-axis in the coloring agent discharging device 15 in FIG. 3). It is noted that the coloring agent discharging device 15 shown in FIG. 3 is a perspective view seen obliquely above a back 15a thereof (this back 15a is a surface on the opposite side from the surface on which the discharge opening of the nozzle is provided).

(B) Vertical Motion

Vertical motion, as used herein, means a motion of the coloring agent discharging device 15 (see FIG. 3) by which the discharge opening of the nozzle moves in a desired direction along the Z-axis.

(C) Oscillating Motion

Oscillating motion, as used herein, means a motion of the coloring agent discharging device 15 by which the discharge opening of the nozzle moves in the direction indicated by an arrow S2 (See, FIG. 3) or in the direction opposite from that direction in arc on the YZ plane or on the plane parallel to the YZ plane.

It is noted that the reference numeral 16 in FIG. 3 denotes a guide when the coloring agent discharging device 15 moves horizontally along the X-axis and the reference numerals 17a and 17b denote supporting members for supporting the guide. Further, the coloring agent discharging device 15 shown in FIG. 3 is shown for the purpose of illustrating the "uniaxial horizontal motion", "vertical motion" and "oscillating motion" of the coloring agent discharging device in Tables 1 through 3 described above and does not mean that the coloring agent discharging device of the present invention is limited to the coloring agent discharging device 15.

The movement of the optical lens holding device and the coloring agent discharging device is different corresponding to the shape and the size of the optical lens to be colored and may be different also corresponding to a specification (coloring pattern) of gradation coloring when gradation coloring is to be implemented. Accordingly, the relative position control device described above is preferably one which has a storage device for storing information on the shape and the size of the optical lens to be colored and on the specification (coloring pattern) of the gradation coloring in implementing the gradation coloring and controls the relative position of the optical lens holding device and the coloring agent discharging device by moving the optical lens holding device and the coloring agent discharging device by the respective desirable mechanisms based on information stored in the storage device.

Then, from the point of view of controlling the relative position of the optical lens holding device and the coloring agent discharging device based on the above information, the inventive optical lens coloring system preferably has an inputting device for storing the information in the storage device. However, when the inventive optical lens coloring system has a storage device and the inputting device described in the explanation on the coloring agent discharging device, it is possible to cause that storage device or the inputting device to function as a storage device or an inputting device of the relative position control device.

The optical lens is colored such that the coloring agent discharged out of the coloring agent discharging device arrives at the predetermined plane substantially in the same direction as a direction normal to the predetermined plane of the optical lens held by the optical lens holding device in optical lens coloring system. The system as above, has an optical lens holding device, a coloring agent discharging device and a relative position control device described above, so that the use of this system allows the optical lens to be colored in a desired pattern, and, specifically, the system enables the optical lens on which gradation coloring is finely implemented to be obtained efficiently and readily.

While the inventive optical lens coloring system may be utilized in coloring a plastic optical lens into a desirable pattern, it is suitable especially in implementing the minute gradation coloring on a spectacle lens or its base material lens.

It is noted that in coloring the optical lens, it is possible to improve the adhesion, etc., of the optical lens and the coloring layer by implementing (1) a chemical treatment by various organic solvents of acid and alkali, (2) a physical treatment by plasma, ultraviolet rays and the like, (3) a cleaning process by using various detergents, (4) various primer processes, and (5) a coating process by using in advance various dyeable hard-coat solutions on the optical lens to be colored.

Further, the coloring agent adhered on the surface of the optical lens may be dried and hardened by means of hot air drying, irradiation of active energy rays or the like. Far infrared rays, ultraviolet rays and the like may be cited as active energy rays in drying and hardening the coloring agent by active energy rays. An anti-reflection film may be formed on the coloring layer as necessary. The anti-reflection film may be formed by known methods.

As described above, the inventive optical lens coloring system is a system which allows one to efficiently obtain an optical lens colored in a desired pattern or an optical lens on which minute gradation coloring is implemented. Accordingly, the present invention allows colored lenses such as gradation colored spectacle lenses to be readily provided.

While the present invention has been described with reference to certain preferred embodiments, one of ordinary skill in the art will recognize that deletions, additions, substitutions, modifications and improvements can be made while remaining within the spirit and scope of the present invention. The scope of the invention is determined solely by the appended claims.

What is claimed is:

1. An optical lens coloring system, comprising an optical lens holding device, a coloring agent discharging device having one or more nozzles for discharging coloring agent, a relative position control device operably connected to relatively position the optical lens holding device and the coloring agent discharging device, wherein the relative position control device relatively positions the optical lens holding device and the coloring agent discharging device so that coloring agent discharged out of the coloring agent discharging device is discharged in a direction substantially normal to a predetermined plane of an optical lens held by the optical lens holding device, wherein each of said one or more nozzles has a discharge opening opening substantially to one plane, and wherein said relative position control device controls the relative position of said optical lens holding device and said coloring agent discharging device by causing said optical lens holding device to make a rotary motion, oscillating motion or biaxial horizontal motion, and causing said coloring agent discharging device to make a vertical motion.

2. An optical lens coloring system, comprising an optical lens holding device, a coloring agent discharging device having one or more nozzles for discharging coloring agent, a relative position control device operably connected to relatively position the optical lens holding device and the coloring agent discharging device wherein the relative position control device relatively positions the optical lens holding device and the coloring agent discharging device so that coloring agent discharged out of the coloring agent discharging device is discharged in a direction substantially normal to a predetermined plane of an optical lens held by the optical lens holding device, wherein each of said one or more nozzles has a discharge opening opening substantially on a predetermined curved plane corresponding to the shape of an optical lens to be colored, and said relative position control device controls the relative position of said optical lens holding device and said coloring agent discharging device by causing said optical lens holding device to make a biaxial horizontal motion or vertical motion with respect to said coloring agent discharging device, and wherein said coloring agent discharging device is relatively fixed.

3. An optical lens coloring system, comprising an optical lens holding device a coloring agent discharging device having one or more nozzles for discharging coloring agent, a relative position control device operably connected to relatively position the optical lens holding device and the coloring agent discharging device wherein the relative position control device relatively positions the optical lens holding device and the coloring agent discharging device so that coloring agent discharged out of the coloring agent discharging device is discharged in a direction substantially normal to a predetermined plane of an optical lens held by the optical lens holding device, wherein said relative position control device controls the relative position of said optical lens holding device and said coloring agent discharging device by causing said optical lens holding device to make a rotary motion, biaxial horizontal motion or vertical motion and causing said coloring agent discharging means to make an oscillating motion.

4. An optical lens coloring system, comprising an optical lens holding device, a coloring agent discharging device having one or more nozzles for discharging coloring agent, a relative position control device operably connected to relatively position the optical lens holding device and the coloring agent discharging device, wherein the relative position control device relatively positions the optical lens holding device and the coloring agent discharging device so that coloring agent discharged out of the coloring agent discharging device is discharged in a direction substantially normal to a predetermined plane of an optical lens held by the optical lens holding device, wherein said relative position control device controls the relative position of said optical lens holding device and said coloring agent discharging device by causing said optical lens holding device to make a rotary motion or biaxial horizontal motion and causing said coloring agent discharging means to make an oscillating motion or vertical motion.

\* \* \* \* \*